US010242481B2

(12) United States Patent
Gruber et al.

(10) Patent No.: US 10,242,481 B2
(45) Date of Patent: Mar. 26, 2019

(54) VISIBILITY-BASED STATE UPDATES IN GRAPHICAL PROCESSING UNITS

(75) Inventors: Andrew Gruber, Arlington, MA (US); Ravi Somnath Jenkal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 649 days.

(21) Appl. No.: 13/421,523

(22) Filed: Mar. 15, 2012

(65) Prior Publication Data

US 2013/0241938 A1    Sep. 19, 2013

(51) Int. Cl.
G06T 1/00 (2006.01)
G06T 15/00 (2011.01)
G06T 11/40 (2006.01)

(52) U.S. Cl.
CPC ............ G06T 15/005 (2013.01); G06T 11/40 (2013.01)

(58) Field of Classification Search
CPC ......... G06T 1/20; G06T 15/005; G09G 5/363; G09G 5/393; G09G 2360/06
See application file for complete search history.

(56) References Cited

U.S. PATENT DOCUMENTS

| | | | |
|---|---|---|---|
| 5,923,338 A * | 7/1999 | Rich | ............................. 345/505 |
| 5,949,428 A | 9/1999 | Toelle et al. | |
| 6,259,461 B1 | 7/2001 | Brown | |
| 6,380,935 B1 | 4/2002 | Heeschen et al. | |
| 6,646,639 B1 * | 11/2003 | Greene et al. | ................ 345/422 |
| 6,684,255 B1 | 1/2004 | Martin | |
| 7,023,437 B1 | 4/2006 | Voorhies et al. | |
| 7,385,608 B1 | 6/2008 | Baldwin | |

(Continued)

FOREIGN PATENT DOCUMENTS

| | | |
|---|---|---|
| CN | 1581234 A | 2/2005 |
| CN | 101639929 A | 2/2010 |

(Continued)

OTHER PUBLICATIONS

TOIGP:"A New Hierarchical Depth Occlusion", VRCIA '06 Proceedings of the 2006 ACM international conference on Virtual reality continuum and its application, pp. 197-203, ACM New York, USA © 2006 by: Mao et al.*

(Continued)

Primary Examiner — Saptarshi Mazumder
(74) Attorney, Agent, or Firm — Shumaker & Sieffert, P.A.

(57) ABSTRACT

In general, techniques are described for visibility-based state updates in graphical processing units (GPUs). A device that renders image data comprising a memory configured to store state data and a GPU may implement the techniques. The GPU may be configured to perform a multi-pass rendering process to render an image from the image data. The GPU determines visibility information for a plurality of objects defined by the image data during a first pass of the multi-pass rendering process. The visibility information indicates whether each of the plurality of objects will be visible in the image rendered from the image data during a second pass of the multi-pass rendering process. The GPU then retrieves the state data from the memory for use by the second pass of the multi-pass rendering process in rendering the plurality of objects of the image data based on the visibility information.

32 Claims, 4 Drawing Sheets

(56) References Cited

U.S. PATENT DOCUMENTS

| | | | |
|---|---|---|---|
| 7,388,581 | B1 | 6/2008 | Diard et al. |
| 7,468,726 | B1 | 12/2008 | Wloka et al. |
| 8,698,820 | B2 | 4/2014 | Cox et al. |
| 9,019,271 | B2 | 4/2015 | Liang |
| 2002/0196252 | A1* | 12/2002 | Liao et al. ............... 345/422 |
| 2003/0146917 | A1* | 8/2003 | Dilliplane ............... 345/582 |
| 2005/0122338 | A1 | 6/2005 | Hong et al. |
| 2007/0146378 | A1 | 6/2007 | Sorgard et al. |
| 2007/0171222 | A1* | 7/2007 | Kowalski ............... 345/420 |
| 2008/0100627 | A1* | 5/2008 | Nystad et al. ............ 345/502 |
| 2008/0150949 | A1 | 6/2008 | Wei et al. |
| 2009/0066694 | A1 | 3/2009 | Redshaw et al. |
| 2009/0091569 | A1 | 4/2009 | Nordlund et al. |
| 2010/0007662 | A1* | 1/2010 | Cox et al. ............... 345/420 |
| 2010/0177105 | A1 | 7/2010 | Nystad et al. |
| 2010/0231588 | A1 | 9/2010 | Barczak |
| 2011/0221743 | A1 | 9/2011 | Keall et al. |
| 2012/0206455 | A1 | 8/2012 | Shreiner |

FOREIGN PATENT DOCUMENTS

| | | |
|---|---|---|
| CN | 102208112 A | 10/2011 |
| EP | 1901234 A2 | 3/2008 |
| JP | 2001283243 A | 10/2001 |
| JP | 2006510973 A | 3/2006 |
| JP | 2008520021 A | 6/2008 |
| JP | 2009295166 A | 12/2009 |
| WO | 2004057533 A2 | 7/2004 |
| WO | 2006051330 A1 | 5/2006 |

OTHER PUBLICATIONS

Antochi, I., "Suitability of Tile-Based Rendering for Low-Power 3D Graphics Accelerators," Dissertation—University Politehnica Bucharest, Oct. 29, 2007, 163 pp.

U.S. Appl. No. 13/236,403, by Kiia Kaappoo Kallio, filed Sep. 19, 2011.

Liang, B.S. et al., "Index Rendering: Hardware-Efficient Architecture for 3-D Graphics in Multimedia System," IEEE Transactions on Multimedia, vol. 4, No. 2, Jun. 2002, 18 pp.

Oat, C., "Efficient Spatial Binning on the GPU-Parallel Computing for Graphics: Beyond Programmable Shading," SIGGRAPH Asia, Dec. 12, 2008, 28 pp.

Ribble, M., "Next-Gen: Tile-Based GPUs," Game Developers Conference Mobile'08, Feb. 18-22, 2008, 36 pp.

Ton, S., "Tap into the Source: Enhancing 3D Apps on Snapdragon," QDevNet Newsletter, Qualcomm Incorporated, Issue 6, Sep. 2011, 6 pp.

Witheiler, M., "STMicroelectronics Kyro II 64MB," AnandTech, Mar. 31, 2001, 17 pp.

Cheng, K.T., et al., "Using mobile GPU for general-purpose computing—a case study of face recognition on smartphones", VLSI Design, Automation and Test (VLSI-DAT), 2011 International Symposium on, IEEE, Apr. 25, 2011, 4 pp.

Hsiao et al., "A Hierarchical Primitive Lists Structure for Tile-Based Rendering", Computational Science and Engineering, 2009. CSE '09. International Conference on, IEEE, Piscataway, NJ, USA, Aug. 29, 2009, pp. 408-413.

International Search Report and Written Opinion—PCT/US2013/027793—ISA/EPO—dated May 6, 2013, 12 pp.

Kim, et al., "A Memory-Efficient Unified Early Z-Test", IEEE Transactions on Visualization and Computer Graphics, IEEE Service Center, Los Alamitos, CA, US, vol. 17, No. 9, Sep. 1, 2011, pp. 1286-1294.

Xiao, J., et al., "A analysis of mobile graphics pipeline with real-time Performance", Audio Language and Image Processing (ICALIP), 2010 International Conference on, IEEE, Piscataway, NJ, USA, Nov. 23, 2010, pp. 489-493.

Response to Written Opinion dated May 6, 2013, from International Application No. PCT/US2013/027793, filed on Dec. 9, 2013, 27 pp.

Second Written Opinion from International Application No. PCT/US2013/027793, dated Mar. 7, 2014, 7 pp.

International Preliminary Report on Patentability—PCT/US2013/027793—The International Bureau of WIPO Geneva, Switzerland, dated May 15, 2014, 9 pp.

Chen C-H., et al., "Two-Level Hierarchical Z-Buffer for 3D Graphics Hardware", proceedings/2002 IEEE International Symposium on Circuits and Systems: May 26, 2002-May 29, 2002, Fairmont Scottsdale Princess, Phoenix-Scottsdale, Arizona, U.S.A; [IEEE International Symposium on Circuits and Systems], IEEE, Institute of Electrical and Electronics Engineers, vol. 1, May 26, 2002 (May 26, 2002), 4 pages, XP002331118, ISBN: 978-0-7803-7448-5.

* cited by examiner

VISIBILITY-BASED STATE UPDATES IN GRAPHICAL PROCESSING UNITS

TECHNICAL FIELD

This disclosure relates to graphical processing units (GPUs) and, more particularly, maintaining state data in a GPU.

BACKGROUND

A device that provides content for visual presentation generally includes a graphics processing unit (GPU). The GPU renders pixels that are representative of the content on a display. The GPU generates one or more pixel values for each pixel on the display and performs graphics processing on the pixel values for each pixel on the display to render each pixel for presentation.

SUMMARY

In general, this disclosure describes techniques for delaying state data updates in a GPU based on visibility information for objects associated with the state updates. A GPU may implement the techniques such that, during a first pass of a multi-pass pixel rendering process, the GPU determines visibility information associated with each object of image data to be rendered by the GPU. This visibility information may indicate whether each object is visible in an output image rendered from the image data during a second pass of the multi-pass rendering process.

Based on this visibility information, the GPU may then retrieve state data for use in the second pass. If the visibility information indicates an object is visible, as one example, the GPU retrieves the current state data, and load this state data from off-chip memory (meaning, as one example, memory external to the GPU) into on-chip memory (meaning, as one example, memory internal to the GPU or integrated within the GPU). If the visibility information indicates that the object is not visible, the GPU does not retrieve this state data. In this manner, the GPU delays retrieval of state data to potentially reduce off-chip memory access and avoid unnecessary consumption of bandwidth over the memory bus connecting the GPU to the off-chip memory.

In one example, a method for rendering image data comprises determining, in a graphics processing unit, visibility information for a plurality of objects defined by the image data during a first pass of a multi-pass rendering process, wherein the visibility information indicates whether each of the plurality of objects will be visible in an image rendered from the image data during a second pass of the multi-pass rendering process. The method also comprises retrieving state data, in the graphics processing unit, for use by the second pass of the multi-pass rendering process in rendering the plurality of objects of the image data based on the visibility information, wherein the first pass finishes prior to the completion of the second pass.

In another example, a device that renders image data comprises means for determining visibility information for a plurality of objects defined by the image data during a first pass of a multi-pass rendering process, wherein the visibility information indicates whether each of the plurality of objects will be visible in an image rendered from the image data during a second pass of the multi-pass rendering process. The device also comprises means for retrieving state data for use by the second pass of the multi-pass rendering process in rendering the plurality of objects of the image data based on the visibility information, wherein the first pass finishes prior to the completion of the second pass.

In another example, a device that renders image data comprises a memory configured to store state data. The device also comprises a processor configured to perform a multi-pass rendering process to render an image from the image data, wherein the processor determines visibility information for a plurality of objects defined by the image data during a first pass of the multi-pass rendering process, wherein the visibility information indicates whether each of the plurality of objects will be visible in the image rendered from the image data during a second pass of the multi-pass rendering process and retrieves the state data from the memory for use by the second pass of the multi-pass rendering process in rendering the plurality of objects of the image data based on the visibility information, wherein the first pass finishes prior to the completion of the second pass.

In another example, a non-transitory computer-readable medium comprises instructions that, when executed, cause one or more processors to determine visibility information for a plurality of objects defined by the image data during a first pass of a multi-pass rendering process, wherein the visibility information indicates whether each of the plurality of objects will be visible in an image rendered from the image data during a second pass of the multi-pass rendering process and retrieve state data for use by the second pass of the multi-pass rendering process in rendering the plurality of objects of the image data based on the visibility information, wherein the first pass finishes prior to the completion of the second pass.

The details of one or more examples are set forth in the accompanying drawings and the description below. Other features, objects, and advantages will be apparent from the description and drawings, and from the claims.

DETAILED DESCRIPTION

Figure 1:
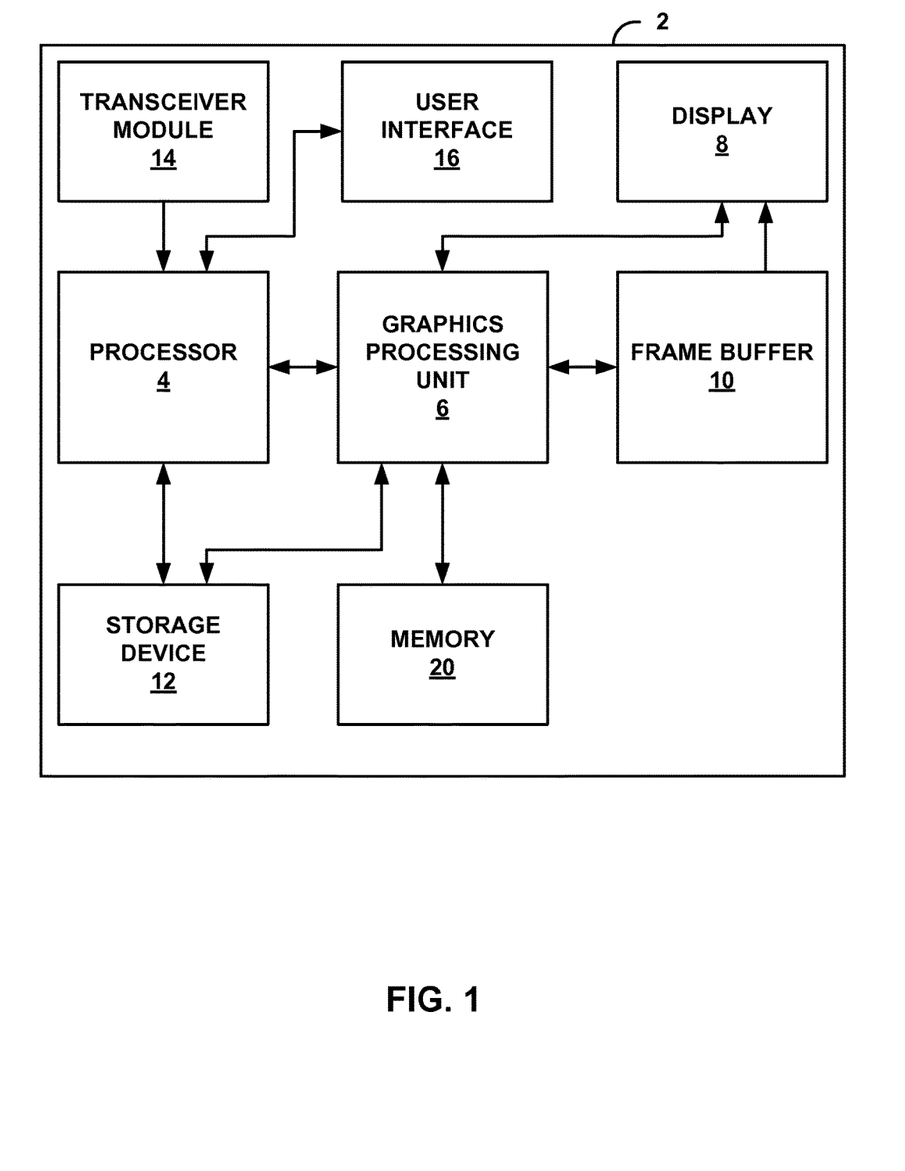
FIG. 1 is a block diagram illustrating a device that may be configured to implement aspects of this disclosure.

FIG. 1 is a block diagram illustrating a device 2 that may be configured to implement aspects of this disclosure. Examples of device 2 include, but are not limited to, wireless devices, mobile or cellular telephones, including so-called smartphones, personal digital assistants (PDAs), video gaming consoles that include video displays, mobile video gaming devices, mobile video conferencing units, laptop computers, desktop computers, television set-top boxes, tablet computing devices, e-book readers, fixed or mobile media players, and the like. Device 2 may include processor 4, graphics processing unit (GPU) 6, display 8, frame buffer 10, storage device 12, transceiver module 14, user interface 16 and memory 18. Device 2 may include additional modules or units not shown in FIG. 1 for ease of illustration purposes. For example, device 2 may include a speaker and a microphone, neither of which are shown in FIG. 1, to effectuate telephonic communications in examples where device 2 is a cellular wireless handset. Furthermore, the various modules and units shown in device 2 may not be necessary in every example of device 2. For example, user interface 16 and display 8 may be external to device 2 in examples where device 2 represents a desktop computer.

Processor 4 may execute one or more applications. Examples of the applications include web browsers, e-mail applications, spreadsheets, video games, audio and/or video capture, playback or editing applications, or other applications that initiate the generation for image data to be presented via display 8. The one or more applications may be stored within storage device 12. In some instances, processor 4 may download the one or more applications via transceiver module 14. Processor 4 may execute the one or more applications based on a selection by a user via user interface 16. In some examples, processor 4 may execute the one or more applications without requiring any user interaction.

Examples of processor 4 include, but are not limited to, a digital signal processor (DSP), general purpose microprocessor, application specific integrated circuit (ASIC), field programmable logic array (FPGA), or other equivalent integrated or discrete logic circuitry. Storage device 12 may comprise one or more computer-readable storage media. Examples of storage device 12 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be executed by a computer or a processor. In some aspects, storage device 12 may include instructions that cause host processor 4 and/or GPU 6 to, when executed, perform the functions ascribed to host processor 4 and GPU 6 in this disclosure.

In general, GPU 6 may perform various functions on the pixels for presentment on display 8. For example, GPU 6 may perform functions such as shading, blending, illuminating, and others to generate pixel values for the pixels to be displayed on display 8. Examples of GPU 6 include, but are not limited to, a DSP, general purpose microprocessor, ASIC, FPGA, or other equivalent integrated or discrete logic circuitry. GPU 6 may comprise a single-core or multi-core processor and may include one or more graphics processing pipelines, which may be configured to opperate according to OpenGL, OpenCL, DirectX 11 or the like. Although shown as separate in FIG. 1, in some examples, processor 4 may include GPU 6. For example, processor 4 and GPU 6 may be formed within the same DSP, general purpose microprocessor, ASIC, FPGA, or other equivalent integrated or discrete logic circuitry. In other examples, processor 4 may serve as an application processor that directs GPU 6 to perform various graphics processing operations. Although one GPU 6 is illustrated in FIG. 1, aspects of this disclosure are not so limited. In some examples, device 2 may include a plurality of GPUs or GPU cores, similar to GPU 6. The graphics processing tasks may be split among these GPUs or GPU cores.

Display 8 may comprise a liquid crystal display (LCD), an organic light emitting diode (OLED) display, a cathode ray tube (CRT) display, a plasma display, or another type of display device. Display 8 includes a plurality of pixels arranged horizontally and vertically in a 2D pixel array.

Each pixel of display 8 may be identifiable by its 2-D coordinate, e.g., (x, y) in Cartesian coordinates. For example, the pixel located at the top-left corner of display 8 may be identified as the pixel located at (0, 0). The pixel immediately to the right of the pixel located at (0, 0) may be identified as the pixel located at (1, 0). The pixel immediately below the pixel located at (0, 0) may be identified as the pixel located at (0, 1). All the pixels of display 8 may be similarly identified. The Cartesian coordinates described above are described for illustration purposes only. The pixels of display 8 may be identifiable by different types of coordinate systems, e.g., polar coordinates, bipolar coordinates, parabolic coordinates, and the like. Furthermore, the example locations of the pixels are also described for illustration purposes only. In some examples, the pixel located at (0, 0) may be at the bottom-left, top-right, bottom-right, or any other pixel location of display 8.

Frame buffer 10 may represent a two-dimensional buffer that includes a plurality of storage locations. The number of storage locations within frame buffer 10 may be substantially similar to the number of pixels to be displayed on display 8. For example, if display 8 is configured to include 640×480 pixels, frame buffer 10 may include 640×480 storage locations. Frame buffer 10 may store the final pixel values for each of the pixels processed by GPU 6. Display 8 may retrieve the final pixel values from frame buffer 10, and display the final image based on the pixel values stored in frame buffer 10.

Storage device 12 may, in some examples, be considered as a non-transitory storage medium. The term "non-transitory" may indicate that the storage medium is not embodied in a carrier wave or a propagated signal. However, the term "non-transitory" should not be interpreted to mean that storage device 12 is non-movable. As one example, storage device 12 may be removed from device 2, and moved to another device. As another example, a storage device, substantially similar to storage device 12, may be inserted into device 2. In certain examples, a non-transitory storage medium may store data that can, over time, change (e.g., RAM).

Transceiver module 14 may represent a module by which device 2 may transmit and receive data. Transceiver module 14 may also be generally referred to as an interface. In this respect, transceiver module 14 may include circuitry to allow wireless or wired communication between device 2 and another device or a network. Transceiver module 14 may include modulators, demodulators, amplifiers and other such circuitry for wired or wireless communication, which are not shown in the example of FIG. 1 for ease of illustration purposes. Additionally, or alternatively, transceiver module 14 may include one or more network adapter units, e.g., to permit communication via a wired or wireless network.

User interface 16 represents hardware or a combination of hardware and software with which a user of device 2 interfaces to interact with device 2. Examples of user interface 16 include, but are not limited to, a trackball, a mouse, a keyboard, and other types of input devices. User interface 16 may also be a touch screen and may be incorporated as a part of display 8.

As noted above, processor 4 may execute one or more applications that may generate image data. In some instances, upon execution of the one or more applications, processor 4 may generate a command stream defining a plurality of primitives to be rendered by GPU 6. The primitives may comprise a line (including curves, splines, etc.), a point, a circle, an ellipse, a polygon (where typically a polygon is defined as a collection of one or more triangles) or any other two-dimensional (2D) primitive. The term "primitive" may also refer to three-dimensional (3D) primitives, such as cubes, cylinders, sphere, cone, pyramid and torus, to name a few examples of 3D primitives. Generally, the term "primitive" refers to any basic geometric shape or element capable of being rendered by GPU 6 for display as an image (or frame in the context of video data) via display 8.

The command stream may define these primitives in order to form one or more 2D and/or 3D objects. Thus, the term "object" refers to one or more primitives, which may be combined to represent an item, animal, person or structure, to name a few examples of objects. The command stream may also define state data, which may be associated with one or more primitives and/or objects (which again may refer to a collection of one or more primitives). State data may define, for example, a color, texture or other aspect of the primitives. State data may additionally refer to cameras, lights (or lighting) and other ambient or contextual data that may impact rendering of the primitives. Considering state data defining a camera for purposes of further illustration, this state data may define a location of the camera with respect to the primitives, a zoom or magnification of the camera, presence and type of camera filters, camera orientation and other aspects associated with capturing an image or video via a camera. Typically, the command stream defines both the primitives and the state data in a 3D model space having an x-axis, a y-axis and a z-axis.

In response to receiving this command stream, GPU 6 may transform the primitives and state data into a world space by applying one or more model transforms (which may also be specified in the state data). Once transformed, GPU 6 may apply a view transform for the active camera (which again may also be specified in the state data defining the camera) to transform the coordinates of the primitives and lights into the camera or eye space. GPU 6 also perform vertex shading to render the appearance of the primitives in view of any active lights. GPU 6 may perform vertex shading in one or more of the above model, world or view space (although its commonly performed in the world space).

Once the primitives are shaded, GPU 6 performs projections to project the image into a unit cube with extreme points, as one example, at (−1, −1, −1) and (1, 1, 1). This unit cube is commonly referred to as a canonical view volume. After transforming the model from the eye space to the canonical view volume, GPU 6 may perform clipping to remove any primitives that do not at least partially reside within the view volume. In other words, GPU 6 may remove any primitives that are not within the frame of the camera. GPU 6 may then map the coordinates of the primitives from the view volume to the screen space, effectively reducing the 3D coordinates of the primitives to the 2D coordinates of the screen.

Given the transformed and projected vertices defining the primitives or objects with their associated shading data, GPU 6 may then rasterize the primitives, meaning that GPU 6 may compute and set colors for the pixels of the screen covered by the objects. During rasterization, GPU 6 may apply any textures associated with the primitives (where textures may comprise state data). GPU 6 may also perform a Z-buffer algorithm, also referred to as a depth test, during rasterization to determine whether any of the primitives and/or objects are occluded by any other objects. The Z-buffer algorithm sorts primitives according to their depth so that GPU 6 knows the order in which to draw each primitive to the screen. GPU 6 outputs rendered tiles to frame buffer 10. Once GPU 6 outputs all of the rendered tiles to form the rendered image, display 8 may retrieve and display this image for consumption by a user of device 2.

While frame buffer 10 is shown in the example of FIG. 1 as separate from off-chip memory 20, frame buffer 10 may be incorporated into or stored within memory 20. That is, frame buffer 10 may consume some portion of memory 20 or memory 20 may reserve some amount of space for a dedicated frame buffer 10. Thus, while frame buffer 10 is shown as being separate from memory 20 in the example of FIG. 1, the techniques may be implemented with respect to frame buffers that are included within memory 20 or any other implementation of a frame buffer, whether separate from or included within an off-chip or on-chip memory.

In some instance, GPUs may perform many rendering operations only to perform the Z-buffer algorithm with the result that entire primitives need not to have been rendered due to other primitives occluding these primitives in their entirety. That is, GPUs draw each primitive, working from the back-most (depth-wise) primitive to the front-most (again, depth-wise) primitive, with the result that some primitives may be rendered only to draw over these primitives with other primitives that are in front of these primitives. As a result of this so-called "overdraw," GPUs were adapted to perform early Z-buffer algorithm testing so as to enable GPUs to identify those primitives that are entirely occluded or not within the eye view to be ignored or bypassed when the GPU performs rendering. In this respect, GPUs were adapted to determine what may be referred to as "visibility information" with respect to each primitive and/or object earlier in the graphics pipeline to potentially reduce the number of primitives that needed to be rendered.

Traditionally, early GPUs were mostly implemented for wired computing devices, such as desktop computers, workstations, servers and the like, due to their computational complexity and the accompanying power required to operate these computationally complex GPUs. Development of fabrication techniques alongside with significant growth in GPU architectures have resulted in GPUs that feature lower-power operation. These lower-power GPUs have since been deployed in mobile computing devices, such as cellular phones or handsets (including so-called "smart phones"), laptop computers, tablet or slate computers, personal digital assistants, portable gaming devices, portable entertainment or media devices, electronic readers ("e-readers"), and the like.

In these mobile devices (which may be considered as one example of power-limited devices in that they rely on batteries that may expire over time and require recharging), the GPUs typically expend some portion of the mobile device's available power in performing off-chip memory accesses to retrieve state data and power on-chip memory to store this state data. Off-chip memory in the context of device 2 may refer to memory 20, which is external to the chip (meaning, GPU 6 in the example of FIG. 1) and hence off-chip with respect to GPU 6. Although not shown in the example of FIG. 1, GPU 6 may include on-chip memory, which refers to memory integrated into GPU 6. Accessing off-chip memory 20 typically requires power to power the bus connecting GPU 6 to memory 20 so that the state and primitive data may be retrieved and/or stored. Large on-chip memories may require larger amounts of power to operate in comparison to smaller on-chip memories.

To offset some of these power concerns, so-called "low-power GPUs" (which may also be referred to as "mobile GPUs") are being developed that implement what may be referred to as a "tile-based" or "bin-based" rendering. That is, these GPUs may divide image data to be rendered into tiles or bins, rendering each tile or bin successively (or sometimes concurrently or in parallel) until the entire image is rendered. By dividing the image into tiles, the GPUs may reduce on-chip memory requirements while also promoting less data retrieval from off-chip memory (considering that the on-chip memory may be large enough to store sufficient image data to render the tile). As an example, GPU 6 may include an on-chip memory with sufficient storage space to store all data for a given tile of the image data, enabling early Z-buffer testing to be performed entirely on-chip without having to access an off-chip Z-buffer stored to off-chip memory 20, which conventionally is maintained in order to render the image in non-tile-based GPUs. By performing this early Z-buffer testing, GPU 6 may additionally reduce the number of off-chip memory reads and writes, with respect to memory 20, considering that only those primitives that are visible are rendered. As a result, GPU 6 may only retrieve state data (such as textures) for visible primitives.

Typically, to render each tile of the image data, these low-power GPUs include a command stream processing module or element that processes the command stream received form the processor or computer processing unit (CPU). The command stream processing module may separate the commands from the command stream so as to generate tile-specific command streams that include only those commands necessary to render primitives that are included within the respective one of the tiles of the image data. In this GPU architecture, the primitives and/or objects do not share state data among each other, meaning that the primitives and/or objects are each associated with their own set of state data.

However, in some GPU architectures, state data is defined iteratively and collectively shared by the primitives and/or objects. Because the state data is shared, GPUs that implement this shared state data architecture do not filter the command stream to generate tile-specific command streams, as state data defined for an object in a first tile may be shared by an object to be rendered in a second different tile. In this implementation, the GPUs may generate separate tile-specific visibility information for each tile that indicates whether each primitive is visible in the corresponding tile. However, even if a primitive is not visible and therefore does not need to be rendered, state data defined for this non-visible primitive may be shared by another visible primitive. Consequently, these GPUs may load state data for primitives regardless of whether these primitives are visible or not.

Yet, because state data is shared among primitives, the GPUs may access access off-chip memory 20 frequently to retrieve state data whether or not the primitive is visible or not. In other words, for each primitive, regardless of whether the primitive is visible in the current two or more tiles being rendered, the GPU retrieves the current state data associated with each of the primitives. In some instances, the GPU may retrieve a current version of the state data from off-chip memory for a non-visible primitive (which is not used to render the current primitive because it is not visible), retrieve a current version of the state data from off-chip memory for another non-visible primitive (which again is not used to render the current primitive because it is not visible), and then retrieve a current version of the state data for a visible primitive (which is used to render the current primitive because it is visible). The two consecutive state data retrievals, which are not used to render non-visible primitives, may needlessly consume power and consume memory bus bandwidth on the memory bus connecting the GPU to the off-chip memory.

In accordance with the techniques described in this disclosure, GPU 6 may, during a first pass of a multi-pass pixel rendering process, determine visibility information associated with each object of image data to be rendered by the GPU. This visibility information may, as noted above, indicate whether each object is visible in a corresponding tile of the image data. Based on this visibility information, GPU 6 may then retrieve state data for use in the second pass. If the visibility information indicates an object is visible, as one example, GPU 6 may retrieve the current state data, loading this state data from off-chip memory (meaning, as one example, memory 20) into on-chip memory (meaning, as one example, memory internal to the GPU or integrated within the GPU). If the visibility information indicates that the object is not visible, GPU 6 does not retrieve this state data. In this manner, GPU 6 delays retrieval of state data to potentially reduce off-chip memory access and avoid unnecessary consumption of bandwidth over the memory bus connecting GPU 6 to off-chip memory 20.

In other words, in an example, GPU 6 performs a form of what may be referred to as "lazy state data retrieval," where GPU 6 only retrieves state data when it is actually used to render a visible primitive. This state data may be associated with both the current visible primitive and previous non-visible primitives, considering that this state data is shared by the objects in the tile-based shared-state architecture implemented by GPU 6. Thus, rather than load just the current state data associated with or defined with respect to the current visible primitive, GPU 6 may load state data associated with the current visible primitive and other non-visible primitives defined in the command stream prior to the current visible primitive.

In operation, GPU 6 may, in one example, generate this visibility information using a low-resolution Z-buffer that considers blocks of pixels (such as blocks of 4×4 pixels) rather than individual pixels value. GPU 6 may construct this Z-buffer at a lower resolution so that this Z-buffer may be stored to on-chip memory or, in other words, to potentially reduce on-chip memory size requirements. GPU 6 performs a low resolution Z algorithm to construct the low resolution Z-buffer. This low resolution Z algorithm involves many of the operations described above that are required to transform the primitives from model space to screen space. Once in screen space, GPU 6 may order the primitives with respect to each other from front to back, testing sub-tiles (typically in a hierarchical fashion, meaning in a recursive fashion involving successively smaller sub-tiles) of the current tile to determine: 1) whether the current primitive is included within the given sub-tile; and 2) if included in the given sub-tile, whether the current primitive is occluded by any other primitive in the particular sub-tile. If the current primitive is included within the current sub-tile and not occluded by any other primitive in the sub-tile, GPU 6 generates visibility information to indicate that the current primitive is visible. GPU 6 may then store this visibility information to off-chip memory 20. In some instances, GPU 6 may first compress this visibility information and then store compressed visibility information in off-chip memory 20.

After completing this binning pass, generating visibility information for each of the tiles, GPU 6 may perform the rendering pass in a manner similar to that described above. However, GPU 6 may associate each primitive or object with a pointer that stores a memory address of a starting location in memory 20 that stores the current state data. Processor 4 may store changes to the state data or even define new state data without impacting GPU 6. These changes do not impact GPU 6 because the pointer may be easily updated to reference a new starting location of the new state data, if the starting location in off-chip memory 20 changes. Moreover, if the starting location does not change, GPU 6 through the use of the pointers only access the most recent version of the state data when this pointer is de-referenced. Because GPU 6 only de-references this pointer and thereby retrieves this state data in response to visible primitives, GPU 6 may ensure that the most recent version of the state data is retrieved. In this respect, GPU 6 may utilize the pointer to perform lazy state data retrieval, in accordance with an example of this disclosure, which may reduce memory accesses while also promoting retrieval of the most recent or up-to-date state data.

While described with respect to mobile or low-power GPUs, the techniques of this disclosure may be implemented with respect to any multi-stage GPU capable of generating visibility information, including high-power GPUs developed for devices that may be considered as having access to large amounts of power (in the sense that they do not receive power from a battery but from a wired or potentially wireless power source). The techniques should therefore not be limited to the examples described in this disclosure.

Figure 2:
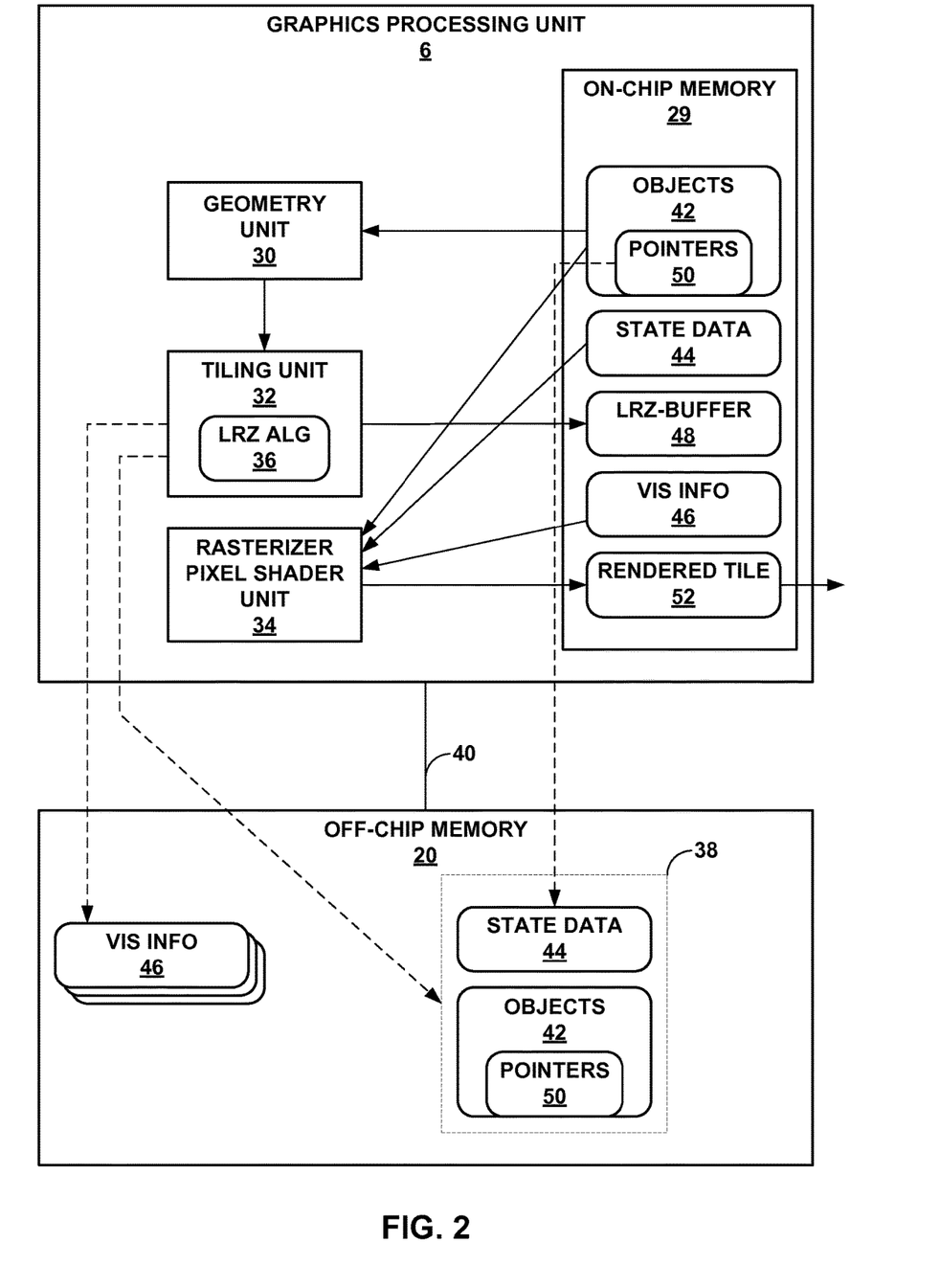
FIG. 2 is a block diagram illustrating in more detail the graphics processing unit and memory of the device shown in the example of FIG. 1.

FIG. 2 is a block diagram illustrating graphics processing unit 6 and memory 20 of device 2 shown in the example of FIG. 1 in more detail. In the example of FIG. 2, GPU 6 may include a graphics processing pipeline, and may include geometry unit 30, tiling unit 32 and rasterizer pixel shader unit 34. While shown as separate units 30-34, one or more of units 30-34 may be combined or may share hardware. That is, units 30-34 are shown as separate units for describing different functionalities and should not be considered as necessarily representing separate hardware units. In some instances, units 30-34 may utilize the same hardware. Commonly, GPUs include a number of hardware units formed in a pipelined architecture. This pipelined architecture may be adapted in various ways to perform multiple passes. For example, the graphics pipeline represented by GPU 6 may be configured to perform the above described binning or tiling pass as a first pass of the multi-pass rendering process. This same graphics pipeline may then be configured to perform the rendering pass of the multi-pass rendering process, where one or more tiles are rendered to output rendered tiles to frame buffer 10.

Geometry unit 30 represents a configuration of the graphics pipeline such that the graphics pipeline performs all of the geometry processing described above to determine the screen-space position of each object to be rendered. Tiling unit 32 represents a configuration of the graphics pipeline to enable GPU 6 to determine one or more tiles and then utilize the screen-space positions of the objects generated by geometry unit 30 to determine which objects are visible with respect to each tile. Tiling unit 32 may implement a low resolution depth (Z) algorithm (LRZ algorithm) to determine visibility information, where the LRZ algorithm is shown in the example of FIG. 2 as "LRZ ALG 36." Rasterizer pixel shader unit 34 represents a configuration of the graphics pipeline of GPU 6 that enables GPU 6 to render one or more of the tiles using the visibility information generated by tiling unit 32. [mention that various aspects of gpu may be programmable while other aspects may be fixed logic units]

In operation, geometry unit 30 may first retrieve image data, such as image data 38, from off-chip memory 20 via memory bus 40, storing this image data 38 to on-chip memory 29. On-chip memory 29 represents memory integrated or internal to GPU 6 for use in rendering an image (or, in this example, tiles of an image). On-chip memory 29 may comprise RAM, dynamic RAM (DRAM), static RAM (SRAM), a cache or other types of memory. Image data 38 may represent a command stream defining one or more objects 42 and state data 44. Objects 42, as noted above, may comprise one or more primitives. Geometry unit 30 may transform objects 42 from model space to screen space, updating objects 42 to reflect the transformation. Geometry unit 30 outputs transformed objects 42 to tiling unit 32.

Tiling unit 32 receives transformed objects 42 and defines tiles in the screen space, which are often square or rectangular portions of the screen (such as a 16×16 pixel tile as one example). After defining the tiles, tiling unit 32 determines which of transformed objects 42 are included within each of the defined tiles. Tiling unit 32 may then implement LRZ algorithm 36 to determine, for those of the transformed objects 42 determined to be included within each defined tile, which of these transformed objects 42 are visible (meaning not occluded by other ones of the transformed objects 42 also included within the same one of the defined tiles). Tiling unit 32 may output visibility information 46 ("vis info 46") for each tile, storing this visibility information 46 to off-chip memory 20 for later use by rasterizer pixel shader unit 34. In order to determine visibility information 46, tiling unit 32 may define a LRZ-buffer 48 in on-chip memory 29. LRZ-buffer 48 may be formed for each tile, where those of transformed objects 42 included within the corresponding tile are arranged by depth (either front-to-back or back-to-front) so that tiling unit 32 may determine whether one or more of transformed objects 42 are entirely occluded. Tiling unit 32 may then output visibility information 46, typically as a stream of ones and zeros, where each one and zero corresponds to an object, with a one value indicating the corresponding object is visible with respect to the current tile and a zero indicating that a corresponding object is not visible with respect to the current tile. Tiling unit 32 may also store transformed objects 42 to off-chip memory 20, replacing objects 42 defined in model space with transformed objects 42 defined in screen space.

Once tiling is complete and visibility information 46 has been generated and stored to off-chip memory 20 for at least one tile, rasterizer pixel shader unit 34 may begin rendering the tiles. Rasterizer pixel shader unit 34 may perform the operations described above to render each pixel in one or more tiles. Rasterizer pixel shader unit 34 may retrieve visibility information 46 associated with the current one or more tiles to be rendered, storing this visibility information 46 to on-chip memory 29. Rasterizer pixel shader unit 34 may also retrieve transformed objects 42, each of which may be associated with a pointer as described above, where these pointers are shown as pointers 50 in the example of FIG. 2. Pointers 50 identify a starting location in off-chip memory 20 to which state data 44 is stored. Rasterizer pixel shader unit 34 stores transformed objects 42 to on-chip memory 29.

After retrieving visibility information 46 and transformed objects 42, rasterizer pixel shader unit 34 begins to render each tile. Rasterizer pixel shader unit 34 may retrieve state data 44 to render pixel data for transformed objects 42 using pointers 50. Rather than retrieve state data 44 regardless of visibility information 46, rasterizer pixel shader unit 34 may only retrieve state data 44 for those objects 42 indicated as being visible in visibility information 46. That is, when visibility information 46 indicates that a corresponding one of objects 42 is visible, rasterizer pixel shader unit 34 de-references the associated one of pointers 50 to retrieve state data 44. When visibility information 46 indicates that a corresponding one of objects 42 is not visible, rasterizer pixel shader unit 34 skips the corresponding one of objects 42 and does not dereference the associated one of pointers 50 to retrieve state data 44. In this way, rasterizer pixel shader unit 34 may implement the lazy state data retrieval techniques described in this disclosure to reduce the number of accesses to off-chip memory 20 and conserve memory bus bandwidth over memory bus 40.

Rasterizer pixel shader unit 34 may render each tile in this manner, storing the rendered tile as rendered tile 52 to on-chip memory 29. Once finished rendering a given tile, rasterizer pixel shader unit 34 may output rendered tile 52 to frame buffer 10, for presentation on display 8, and begin rendering the next tile if all of the tiles of the rendered image have not been completed.

Figure 3:
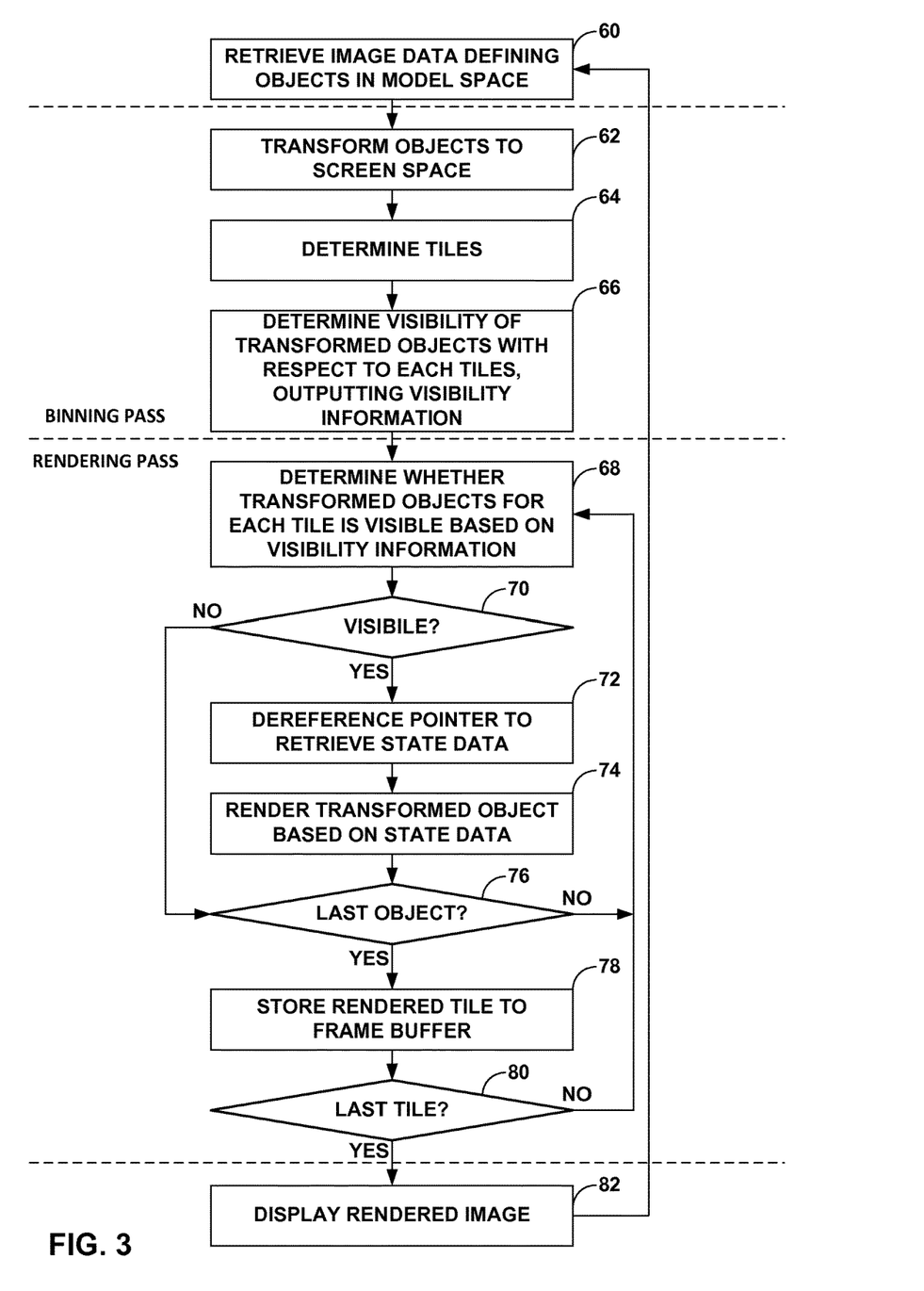
FIG. 3 is a flowchart illustrating example operation of a graphics processing unit in implementing state data retrieval techniques described in this disclosure.

FIG. 3 is a flowchart illustrating example operation of a graphics processing unit, such as GPU 6 shown in the example of FIG. 2, in implementing the lazy state data retrieval techniques described in this disclosure. While described below with respect to a particular type of multi-pass GPU, i.e., GPU 6 that performs a tiling or binning pass and a rendering pass, the techniques may be implemented by any type of multi-pass GPU that first determines visibility information and then renders an image using this visibility information.

Initially, geometry unit 30 of GPU 6 may first retrieve image data defining one or more objects 42 in model space from off-chip memory 20 via memory bus 40, storing this image data 38 to on-chip memory 29 (60). Geometry unit 30 may then begin the binning pass, transforming objects 42 from model space to screen space in the manner described above (62). Geometry unit 30 may update objects 42 in on-chip memory 29 to reflect the transformation, outputting transformed objects 42 to tiling unit 32.

Tiling unit 32 receives transformed objects 42 and continues to implement the binning pass by determining tiles in the screen space (64), which, as noted above, are may be square or rectangular portions of the screen (such as a 16×16 pixel tile as one example). After determining the tiles, tiling unit 32 determines which of transformed objects 42 are included within each of the defined tiles. Tiling unit 32 may then implement LRZ algorithm 36 to determine, for those of the transformed objects 42 determined to be included within each defined tile, which of these transformed objects 42 are visible (meaning not occluded by other ones of the transformed objects 42 also included within the same one of the defined tiles) in the manner described above, outputting visibility information 46 ("vis info 46") for each tile (66). Tiling unit 32 may then store this visibility information 46 to off-chip memory 20 for later use by rasterizer pixel shader unit 34. Visibility information 46, typically, comprises a stream of ones and zeros, where each one and zero corresponds to an object, with a one value indicating the corresponding object is visible with respect to the current tile and a zero indicating that a corresponding object is not visible with respect to the current tile. Tiling unit 32 may also store transformed objects 42 to off-chip memory 20 replacing objects 42 defined in model space with transformed objects 42 defined in screen space.

Once tiling is complete and visibility information 46 has been generated and stored to off-chip memory 20 for at least one tile, rasterizer pixel shader unit 34 may perform the rendering pass to begin rendering the tiles. Rasterizer pixel shader unit 34 may perform the operations described above to render each pixel in one or more tiles. Rasterizer pixel shader unit 34 may retrieve visibility information 46 associated with the current one or more tiles to be rendered, storing this visibility information 46 to on-chip memory 29. Rasterizer pixel shader unit 34 may also retrieve transformed objects 42, each of which may be associated with a pointer as described above, where these pointers are shown as pointers 50 in the example of FIG. 2. While described as each of objects 42 being associated with a pointer 50, two or more of objects 42 may be associated with the same one of pointers 50. Pointers 50 identify a starting location in off-chip memory 20 to which state data 44 is stored. Rasterizer pixel shader unit 34 stores transformed objects 42 to on-chip memory 29.

After retrieving visibility information 46 and transformed objects 42, rasterizer pixel shader unit 34 begins to render each tile. Rasterizer pixel shader unit 34 may retrieve state data 44 to render pixel data for transformed objects 42 using pointers 50. Rather than retrieve state data 44 regardless of visibility information 46, rasterizer pixel shader unit 34 may only retrieve state data 44 for those objects 42 indicated as being visible in visibility information 46. In other words, rasterizer pixel shader unit 34 determines whether transformed objects 42 for each tile are visible based on visibility information 46 (68). When visibility information 46 indicates that a corresponding one of objects 42 is visible ("YES" 70), rasterizer pixel shader unit 34 de-references the associated one of pointers 50 to retrieve state data 44 and render the corresponding one of transformed objects 42 based on retrieved state data 44 (72, 74). When visibility information 46 indicates that a corresponding one of objects 42 is not visible ("NO" 70), rasterizer pixel shader unit 34 skips the corresponding one of objects 42 and does not dereference the associated one of pointers 50 to retrieve state data 44. In this way, rasterizer pixel shader unit 34 may implement the lazy state data retrieval techniques described in this disclosure to reduce the number of accesses to off-chip memory 20 and conserve memory bus bandwidth over memory bus 40.

Rasterizer pixel shader unit 34 may render each tile in this manner. That is, rasterizer pixel shader unit 34 may continue to determine whether each of transformed objects 42 are visible for the current tile based on visibility information 46 until the last one of objects 42 is processed and/or rendered for the current tile (76). If the last objects has not been processed and/or rendered ("NO" 76), rasterizer pixel shader unit 34 continues in the manner described above to render each object based on visibility information 46, only retrieving state data 44 when the corresponding object is indicated as being visible by visibility information 46 and rendering the corresponding one of objects 46 based on this retrieved state data 44 (68-76). If the last one of objects 42 has been processed ("YES" 76), rasterizer pixel shader unit 34 stores the rendered tile as rendered tile 52 to on-chip memory 29, which is then stored to frame buffer 10 (78). Once finished rendering a given tile, rasterizer pixel shader unit 34 may begin rendering the next tile if all of the tiles of the rendered image have not been completed, repeating the rendering pass described above ("NO" 80; 68-78). If the last tile has been rendered and stored to frame buffer 10 ("YES" 80; meaning that the entire image has been rendered and stored to frame buffer 10), GPU 6 may inform display 8, which may then display the rendered image (82).

Figure 4:
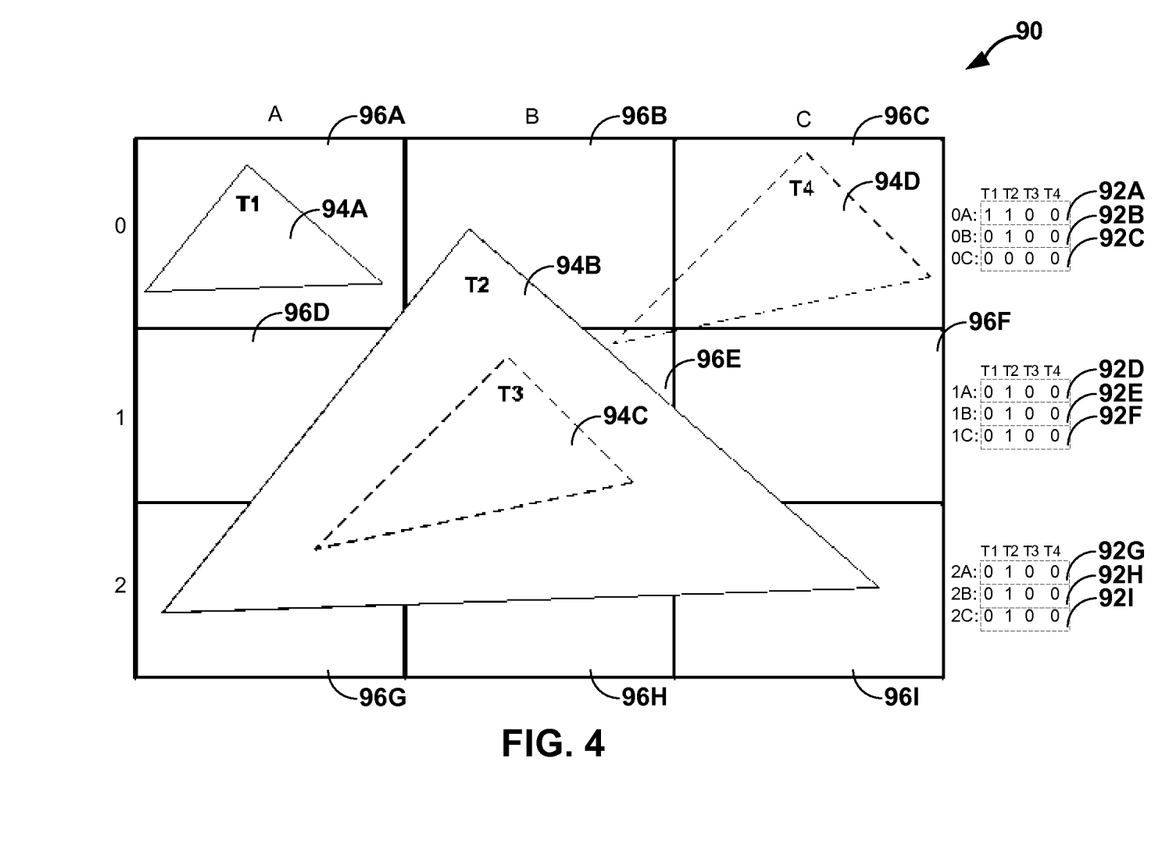
FIG. 4 is a diagram illustrating an example of transformed image data from which exemplary visibility information has been generated in accordance with an example of the techniques described in this disclosure.

FIG. 4 is a diagram illustrating an example of transformed image data 90 from which exemplary visibility information 92A-92I has been generated. In the example of FIG. 4, transformed image data 90 represents image data that has been transformed from model space to screen space. A GPU that implements the techniques described in this disclosure, such as GPU 6 shown in the example of FIG. 2, may transform image data to form transformed image data 90. Transformed image data 90 may include transformed objects 94A-94D ("objects 94"), which in the example of FIG. 4 are each shown as triangles denoted as T1-T4. Those of objects shown as having dashed lines, i.e., objects 94C, 94D in the example of FIG. 4, represent objects that are not visible. Object 94C is not visible because object 94C is fully occluded by object 94B.

Tiling unit 32 of GPU 6 may determine tiles 96A-96I ("tiles 96") during a binning or tiling pass, as described above, where tiles 96 may be referred to as "tile" followed by a row (denoted as 0, 1 and 2 in the example of FIG. 4) and column (denoted as A, B and C in the example of FIG. 4). Tile 96A, for example, may also be referred to as "tile 0A." Tile 96B may be referred to as "tile0B," tile 96D may be referred to as "tile1A," and so forth. Tiling unit 32 of GPU 6 may determine visibility information 92A-92I ("visibility information 92"), which may represent one example of visibility information 46 shown in the example of FIG. 2. Each of visibility information 92 correspond to one of tiles 96, as indicated to the left of each of visibility information 92. That is, visibility information 92A corresponds to tile 0A (or tile 96A), while visibility information 92B corresponds to tile 0B (or tile 96B), and so on.

Each of visibility information 92 includes a bit for each of objects 94 (where these objects are denoted by T1-T4 in the example of FIG. 4). A one value ("1") for one of these bits indicates that the corresponding object T1-T4 (or object 94) is visible in the corresponding tile 0A-2C (or tiles 96). A zero value ("0") for one of these bits indicates that the corresponding object T1-T4 (or object 94) is not visible in the corresponding tile 0A-2C (or tiles 96). For example, visibility information 92A comprises a bit stream of four bits whose values are 1100, indicating that, for tile 96A, object 94A is visible and object 94B is visible. Visibility information 92B comprises a bit stream of four bits whose values are 0100, indicate that, for tile 96B, object 94B is visible. As another example, visibility information 92E comprises a bit stream of four bits whose values are 0100, indicate that, for tile 96E, object 94B is visible, while object 94C is not visible because it is fully occluded by object 94B in tile 96E. In this manner, tiling unit 32 may generate a corresponding one of visibility information 92 for each of tiles 96 of transformed image data 90.

Rasterizer pixel shader 34 may then retrieve visibility information 92 and only retrieve state data based on this visibility information 92 in accordance with the techniques described in this disclosure in more detail above. For example, consider visibility information 92D, which indicates that object 94A is not visible, object 94B is visible and objects 94C and 94D are not visible. In this example, rasterizer pixel shader 34 may not retrieve state data 44 from off-chip memory 20 for object 94A because visibility information 92D indicates that this object 94A is not visible. However, for object 94B, rasterizer pixel shader 34 may dereference pointer 50 to retrieve state data 44 for rendering object 94B because this object 94B, according to visibility information 92D, is visible within the tile. In this respect, the techniques may enable a GPU to only retrieve state data when needed or, in other words, perform lazy state data updates or retrieval.

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method for rendering image data comprising:
generating, in a graphics processing unit, visibility information for a plurality of primitives defined by the image data during a first pass of a multi-pass rendering process, wherein the visibility information indicates for each of the plurality of primitives whether any of an object formed by the plurality of primitives will be visible anywhere in an image rendered from the image data during a second pass of the multi-pass rendering process; and
retrieving, in the graphics processing unit, state data associated with the object a single time for the entire object per rendered portion of the image data based on the visibility information for the plurality of primitives, wherein the state data is used by the second pass of the multi-pass rendering process in rendering the object, and wherein the first pass finishes prior to completion of the second pass.

2. The method of claim 1, further comprising segmenting the image data into a plurality of tiles,
wherein generating visibility information comprises generating tile-specific visibility information for each of the plurality of tiles during the first pass of the multi-pass rendering process, wherein the tile-specific visibility information indicates, for a corresponding one of the plurality of tiles and for each of the plurality of primitives as a whole, whether any of the object will be visible anywhere in a corresponding tile of the image rendered from the image data during the second pass of the multi-pass rendering process, and wherein retrieving state data comprises retrieving state data associated with the object a single time per tile for the entire object based on the tile-specific visibility information for the plurality of primitives, the state data used by the second pass of the multi-pass rendering process in rendering the object to output the respective one of the plurality of tiles of the image.

3. The method of claim 1, wherein the graphics processing unit implements the multi-pass rendering process, wherein the object includes a pointer that identifies a starting location in a memory external from the graphics processing unit that stores the state data, and wherein retrieving the state data comprises dereferencing the pointer to access the starting location in the memory external from the graphics processing unit and to retrieve the state data for use by the second pass of the multi-pass rendering process in rendering the plurality of primitives of the image data when the visibility information indicates that the object is visible.

4. The method of claim 1, wherein the object shares the state data with another object.

5. The method of claim 1, wherein the image data defines the plurality of primitives in model space, wherein the method further comprises transforming the plurality of primitives from the model space to a screen space so as to generate transformed image data that defines a plurality of transformed primitives in the screen space, and wherein generating the visibility information comprises generating visibility information for the plurality of transformed primitives defined by the transformed image data during the first pass of the multi-pass rendering process.

6. The method of claim 1, wherein generating the visibility information comprises generating the visibility information for the plurality of primitives defined by the image data prior to rendering the plurality of primitives defined by the image data to generate the image.

7. The method of claim 1, wherein generating the visibility information comprises performing a low resolution Z-buffer process to generate the visibility information.

8. The method of claim 1, wherein the GPU resides within a mobile computing device.

9. A device that renders image data, the device comprising:

means for generating visibility information for a plurality of primitives defined by the image data during a first pass of a multi-pass rendering process, wherein the visibility information indicates for each of the plurality of primitives whether any of an object formed by the plurality of primitives will be visible anywhere in an image rendered from the image data during a second pass of the multi-pass rendering process; and means for retrieving state data associated with the object a single time for the entire object per rendered portion of the image data based on the visibility information for the plurality of primitives, wherein the state data is used by the second pass of the multi-pass rendering process in rendering the object, and wherein the first pass finishes prior to completion of the second pass.

10. The device of claim 9, further comprising means for segmenting the image data into a plurality of tiles, wherein the means for generating visibility information comprises means for generating tile-specific visibility information for each of the plurality of tiles during the first pass of the multi-pass rendering process, wherein the tile-specific visibility information indicates whether, for a corresponding one of the plurality of tiles and for each of the plurality of primitives, whether any of the object will be visible anywhere in a corresponding tile of the image rendered from the image data during the second pass of the multi-pass rendering process, and wherein the means for retrieving state data comprises means for retrieving state data associated with the object a single time per tile for the entire object based on the tile-specific visibility information for the plurality of primitives, the state data used by the second pass of the multi-pass rendering process in rendering the object to output the respective one of the plurality of tiles of the image.

11. The device of claim 9, wherein a graphics processing unit implements the multi-pass rendering process and includes the means for generating the visibility information and the means for retrieving state data, wherein the object includes a pointer that identifies a starting location in a memory external from the graphics processing unit that stores the state data, and wherein the means for retrieving the state data comprises means for dereferencing the pointer to access the starting location in the memory external from the graphics processing unit and to retrieve the state data for use by the second pass of the multi-pass rendering process in rendering the plurality of primitives of the image data when the visibility information indicates that the object is visible.

12. The device of claim 9, wherein object shares the state data with another object.

13. The device of claim 9, wherein the image data defines the plurality of primitives in model space, wherein the device further comprises means for transforming the plurality of primitives from the model space to a screen space so as to generate transformed image data that defines a plurality of transformed objects in the screen space, and wherein the means for generating the visibility information comprises means for generating visibility information for the plurality of transformed primitives defined by the transformed image data during the first pass of the multi-pass rendering process.

14. The device of claim 9, wherein the means for generating the visibility information comprises means for generating the visibility information for the plurality of primitives defined by the image data prior to rendering the plurality of primitives defined by the image data to generate the image.

15. The device of claim 9, wherein the means for generating the visibility information comprises means for performing a low resolution Z-buffer process to generate the visibility information.

16. The device of claim 9, wherein the device comprises a mobile computing device.

17. A device that renders image data, the device comprising:
- a memory configured to store state data; and
- a processor configured to perform a multi-pass rendering process to render an image from the image data, wherein the processor generates visibility information for a plurality of primitives defined by the image data during a first pass of the multi-pass rendering process, wherein the visibility information indicates for each of the plurality of primitives whether any of an object formed by the plurality of primitives will be visible anywhere in the image rendered from the image data during a second pass of the multi-pass rendering process and retrieves, from the memory, the state data associated with the object a single time for the entire object per rendered portion of the image data based on the visibility information for the plurality of primitives, wherein the state data is used by the second pass of the multi-pass rendering process in rendering the object, and wherein the first pass finishes prior to completion of the second pass.

18. The device of claim 17, further comprising segmenting the image data into a plurality of tiles,
- wherein the processor is further configured to generate tile-specific visibility information for each of the plurality of tiles during the first pass of the multi-pass rendering process, wherein the tile-specific visibility information indicates whether, for a corresponding one of the plurality of tiles and for each of the plurality of primitives, any of the object will be visible anywhere in a corresponding tile of the image rendered from the image data during the second pass of the multi-pass rendering process, and
- wherein the processor is also configured to retrieve the state data associated with the object a single time per tile for the entire object based on the tile-specific visibility information for the plurality of primitives, the state data used by the second pass of the multi-pass rendering process in rendering the object to output the respective one of the plurality of tiles of the image.

19. The device of claim 17,
- wherein the processor comprises a graphics processing unit,
- wherein the object includes a pointer that identifies a starting location in a memory external from the graphics processing unit that stores the state data, and
- wherein the graphics processing unit is configured to dereference the pointer to access the starting location in the memory external from the graphics processing unit and retrieve the state data for use by the second pass of the multi-pass rendering process in rendering the plurality of primitives of the image data when the visibility information indicates that the object is visible.

20. The device of claim 17, wherein the object shares the state data with another object.

21. The device of claim 17,
- wherein the image data defines the plurality of primitives in model space,
- wherein the processor is further configured to transform the plurality of primitives from the model space to a screen space so as to generate transformed image data that defines a plurality of transformed primitives in the screen space, and generate the visibility information for the plurality of transformed primitives defined by the transformed image data during the first pass of the multi-pass rendering process.

22. The device of claim 17, wherein the processor is configured to generate the visibility information for the plurality of primitives defined by the image data prior to rendering the plurality of primitives defined by the image data to generate the image.

23. The device of claim 17, wherein the processor is further configured to perform a low resolution Z-buffer process to generate the visibility information.

24. The device of claim 17, wherein the device comprises a mobile computing device.

25. A non-transitory computer-readable medium comprising instructions that, when executed, cause one or more processors to:
- generate visibility information for a plurality of primitives defined by the image data during a first pass of a multi-pass rendering process, wherein the visibility information indicates for each of the plurality of primitives whether any of an object formed by the plurality of primitives will be visible anywhere in an image rendered from the image data during a second pass of the multi-pass rendering process; and
- retrieve state data associated with the object a single time for the entire object per rendered portion of the image data based on the visibility information for the plurality of primitives, wherein the state data is used by the second pass of the multi-pass rendering process in rendering the object, and wherein the first pass finishes prior to the completion of the second pass.

26. The non-transitory computer-readable medium of claim 25, further comprising instructions that, when executed, cause the one or more processors to:
- segment the image data into a plurality of tiles;
- generate tile-specific visibility information for each of the plurality of tiles during the first pass of the multi-pass rendering process, wherein the tile-specific visibility information indicates whether, for a corresponding one of the plurality of tiles for each of the plurality of primitives, any of the object will be visible anywhere in a corresponding tile of the image rendered from the image data during the second pass of the multi-pass rendering process, and
- retrieve the state data associated with the object a single time per tile for the entire object based on the tile-specific visibility information for the plurality of primitives, the state data used by the second pass of the multi-pass rendering process in rendering the object to output the respective one of the plurality of tiles of the image.

27. The non-transitory computer-readable medium of claim 25,
- wherein the one or more processors comprises at least one graphics processing units,
- wherein the object includes a pointer that identifies a starting location in a memory external from the graphics processing unit that stores the state data, and
- wherein the non-transitory computer-readable medium further comprises instructions that, when executed, cause the at least one graphics processing unit to retrieve the state data comprises dereferencing the pointer to access the starting location in the memory external from the graphics processing unit and retrieve the state data for use by the second pass of the multi-pass rendering process in rendering the plurality of primitives of the image data when the visibility information indicates that the object is visible.

28. The non-transitory computer-readable medium of claim 25, wherein the object shares the state data with another object.

29. The non-transitory computer-readable medium of claim 25,
wherein the image data defines the plurality of primitives in model space,
wherein the non-transitory computer-readable medium further comprises instructions that, when executed, cause the one or more processors to:
transform the plurality of primitives from the model space to a screen space so as to generate transformed image data that defines a plurality of transformed primitives in the screen space; and
generate the visibility information for the plurality of transformed primitives defined by the transformed image data during the first pass of the multi-pass rendering process.

30. The non-transitory computer-readable medium of claim 25, further comprising instructions that, when executed, cause the one or more processors to generate the visibility information for the plurality of primitives defined by the image data prior to rendering the plurality of primitives defined by the image data to generate the image.

31. The non-transitory computer-readable medium of claim 25, further comprising instructions that, when executed, cause the one or more processors to perform a low resolution Z-buffer process to generate the visibility information.

32. The non-transitory computer-readable medium of claim 25, wherein a mobile computing device includes the non-transitory computer-readable medium and the one or more processors.

* * * * *